US005672860A

United States Patent [19]

Miller et al.

[11] Patent Number: 5,672,860
[45] Date of Patent: Sep. 30, 1997

[54] INTEGRATED HAND-HELD BAR CODE PROCESSING DEVICE CAPABLE OF AUTOMATIC SCAN AND DATA DISPLAY

[75] Inventors: Phillip Miller; Jerry L. Walter; Darrell L. Boatwright; Darald R. Schultz, all of Cedar Rapids, Iowa

[73] Assignee: Norand Corporation, Cedar Rapids, Iowa

[21] Appl. No.: 371,747

[22] Filed: Jan. 12, 1995

Related U.S. Application Data

[63] Continuation of Ser. No. 257,433, Jun. 8, 1994, abandoned, which is a continuation of Ser. No. 832,052, Feb. 6, 1992, abandoned, which is a continuation-in-part of Ser. No. 600,053, Oct. 17, 1990, abandoned, which is a continuation of Ser. No. 136,097, Dec. 21, 1987, abandoned, said Ser. No. 832,052, is a continuation-in-part of Ser. No. 305,302, Jan. 31, 1989, abandoned.

[51] Int. Cl.⁶ ........................... G06K 7/10
[52] U.S. Cl. ........................... 235/472; 235/462
[58] Field of Search ........................... 235/472, 462, 235/467, 470, 383, 385; 250/239; 362/399

[56] References Cited

U.S. PATENT DOCUMENTS

| | | | |
|---|---|---|---|
| 3,621,265 | 11/1971 | Berler | 235/462 |
| 4,377,741 | 3/1983 | Brekka et al. | 235/472 |
| 4,387,297 | 6/1983 | Swartz et al. | 235/472 |
| 4,409,470 | 10/1983 | Shepard et al. | 239/462 |
| 4,458,238 | 7/1984 | Learn | 235/462 |
| 4,460,120 | 7/1984 | Shepard et al. | 235/462 |
| 4,496,831 | 1/1985 | Swartz et al. | 235/472 |
| 4,603,262 | 7/1986 | Eastman et al. | 235/462 |
| 4,621,189 | 11/1986 | Kumar | 235/472 |
| 4,673,805 | 6/1987 | Shepard et al. | 235/462 |
| 4,684,793 | 8/1987 | Kamhuber | 235/462 |
| 4,713,617 | 12/1987 | Michalski | 324/395 |
| 4,721,849 | 1/1988 | Davis et al. | 235/462 |
| 4,758,717 | 7/1988 | Sheperd et al. | 235/462 |
| 4,760,248 | 7/1988 | Swartz et al. | 235/462 |
| 4,808,018 | 2/1989 | Robertson et al. | 235/462 |
| 4,845,350 | 7/1989 | Shepard et al. | 235/462 |
| 5,107,100 | 4/1992 | Shepard et al. | 235/472 |
| 5,157,687 | 10/1992 | Tymes | 235/462 |

FOREIGN PATENT DOCUMENTS 3248287  11/1991  Japan .................. 235/472

OTHER PUBLICATIONS

P.J. Kennedy, "Hand-Held Data Input Device", IBM Technical Disclosure Bulletin, vol. 26, No. 11, Apr. 1984.

Primary Examiner—Donald T. Hajec
Assistant Examiner—Thien Minh Le
Attorney, Agent, or Firm—McAndrews, Held & Malloy, Ltd.; R. Lewis Gable

[57] ABSTRACT

In an exemplary embodiment, the reader unit has a pistol configuration with the automatic scan components in a barrel portion and a battery pack therefor in a handgrip portion. A display may be directed upwardly and rearwardly in the normal hand-held disposition of the reader unit during scanning, and may be of relatively large area, e.g., so as to be adaptable to direct store delivery transactions. A smart card receptacle may facilitate use of the integrated reader and terminal unit for complex transactions. A base station for the hand-held unit may include an interface such that the memory of the hand-held unit appears as a disk drive during downloading to a personal computer.

19 Claims, 3 Drawing Sheets

INTEGRATED HAND-HELD BAR CODE PROCESSING DEVICE CAPABLE OF AUTOMATIC SCAN AND DATA DISPLAY

REFERENCE TO RELATED APPLICATIONS

Cross-reference is made to the following related patent applications, each of which is specifically incorporated herein by reference:

1) This application is a continuation of U.S. patent application Ser. No. 08/257,433, entitled "Integrated Hand-Held Bar Code Processing Device Capable of Automatic Scan and Data Display," filed Jun. 8, 1994 in the names of Phillip Miller et al. (now abandoned), which in turn is a continuation of U.S. patent application Ser. No. 07/832,052, entitled "Integrated Hand-Held Bar Code Processing Device Capable of Automatic Scan and Data Display," filed Feb. 6, 1992 in the names of Phillip Miller et al. (now abandoned), which in turn a continuation-in-part of U.S. patent application Ser. No. 07/600,053, entitled "Integrated Hand-Held Bar Code Processing Device Capable of Automatic Scan and Data Display," filed Oct. 17, 1990 in the names of Phillip Miller et al. (now abandoned), which in turn is a continuation of U.S. patent Ser. No. 07/136,097, entitled "Integrated Hand-Held Bar Code Processing Device Capable of Automatic Scan and Data Display," filed Dec. 21, 1987 in the names of Phillip Miller et al. (now abandoned), said Ser. No. 07/832,052 being also a continuation-in-part of Ser. No. 07/305,302, DN6649, filed Jan. 31, 1989, now abandoned Ser. No. 07/305,302 is hereby incorporated herein by reference.

2) U.S. Ser. No. 07/305,302, entitled "Vehicle Data System" filed Jan. 31 1989 in the names of Phillip Miller, Steven E. Koenck, Joseph J. Kubler, Keith K. Cargin, Jr., George E. Hanson, and Patrick H. Davis, now abandoned.

BACKGROUND OF THE INVENTION

In a typical portable laser scanning system, a hand-held unit contains the laser scanning head, while a body harness supports the remaining scanner system circuitry. A cable interconnects the scanner head with the body harness.

In a field of portable scanners utilizing image sensors such as charge coupled device photosensor arrays, the scanner system also typically comprises a hand-held scanner unit and a separate terminal unit containing a battery pack which supplies energy for flash illumination of the light source means.

An improved laser bar code scanner system is disclosed in a pending application assigned to the present assignee, U.S. Ser. No. 905,779 filed Sep. 10, 1986, Attorneys Docket No. 5726, now U.S. Pat. No. 4,882,476, and this disclosure is incorporated herein by reference in its "entirety". Such a system utilizes a deflected beam which may cover an entire bar code at a rate of thirty-six scans per second, and from the standpoint of the operator can be regarded as an instantaneous type bar code scanner. In particular such a deflected beam scanner is essentially instantaneous in comparison with a wand-type scanner which is manually moved across a bar code over a time interval of the order of one second.

Examples of instantaneous scanners which utilize an array of photosensor elements to register an image of a bar code include those disclosed in U.S. Pat. Nos. 4,282,425 and 4,570,057, and in a pending patent application U.S. Ser. 894,689 filed Aug. 8, 1986, Attorneys Docket No. 5740, now U.S. Pat. No. 4,877,949, each of these being assigned to the present assignee. The disclosure of said application Ser. No. 894,689 is hereby incorporated herein by reference in its entirety.

SUMMARY OF THE INVENTION

In accordance with an illustrated embodiment of the invention, a non-contact automatic scan bar code reader device having either deflected beam scanning and concurrent serial reading of the bar code, or having optics for focusing of the bar code on an image type sensor array, is further provided with an integral keyboard and display. Preferably such integrated scanner and terminal unit is comfortably held in an orientation providing a generally vertically disposed handgrip and a generally upwardly directed display so that the display is readily visible to the operator during scanning operation without requiring awkward maneuvering.

In a further preferred development, the integrated instant scanner and terminal unit is provided with a display which is inclined at an acute angle so as to be directed generally rearwardly and upwardly when the handgrip is essentially vertically disposed; this configuration provides for optimum readability of the display during scanning operation.

To further enhance the versatility, in a most preferred embodiment, a smart card receptacle is provided. In this way an initial set of data previously recorded on the card can be made accessible to the unit in an extremely quick and convenient manner. Furthermore, during a transaction, information may be added or modified on the card, so that the card provides a record of transactions which can be readily removed from the hand-held unit, and transported independently of the unit, e.g. in the user's pocket.

Where data is to be downloaded from the combined instant scanner and terminal unit, it is conceived that the unit may emulate a disk drive and be interfaced to a personal computer so that commands which are standard for the case of a disk drive may be used in communication with the hand-held unit.

Various objects, features and advantages of the invention will be apparent from the following detailed description taken in connection with the accompanying drawings, and from the individual features of the appended claims.

DETAILED DESCRIPTION

Figure 1:
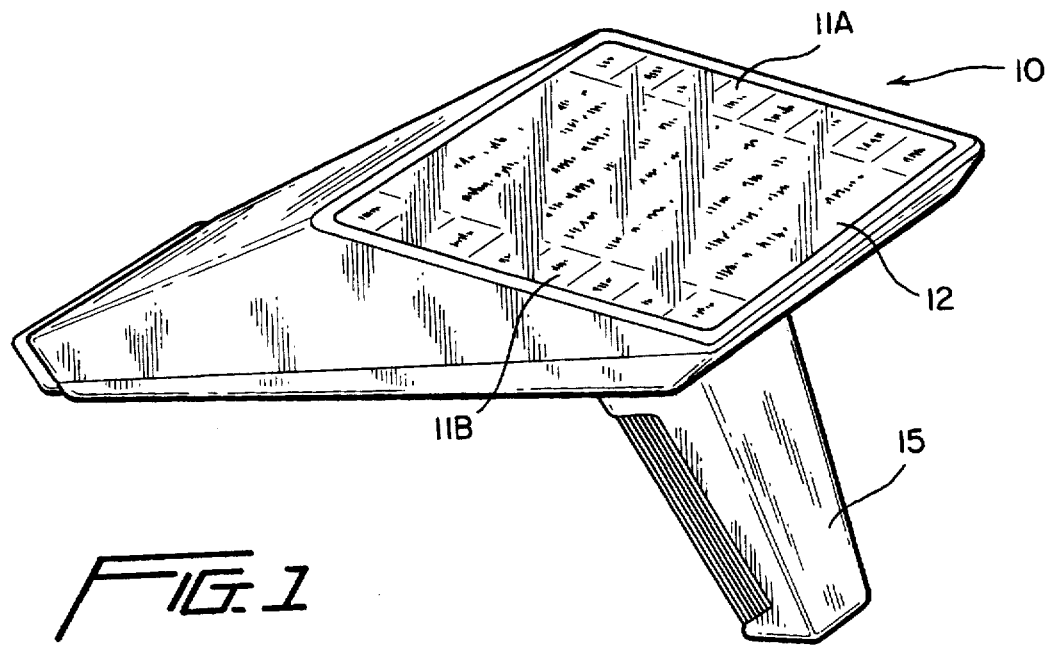
FIG. 1 is a somewhat diagrammatic perspective view of an integrated hand-held bar code processing device capable of automatic scan and data display and which may incorporate features shown in FIGS. 2 and 3.
Figure 2:
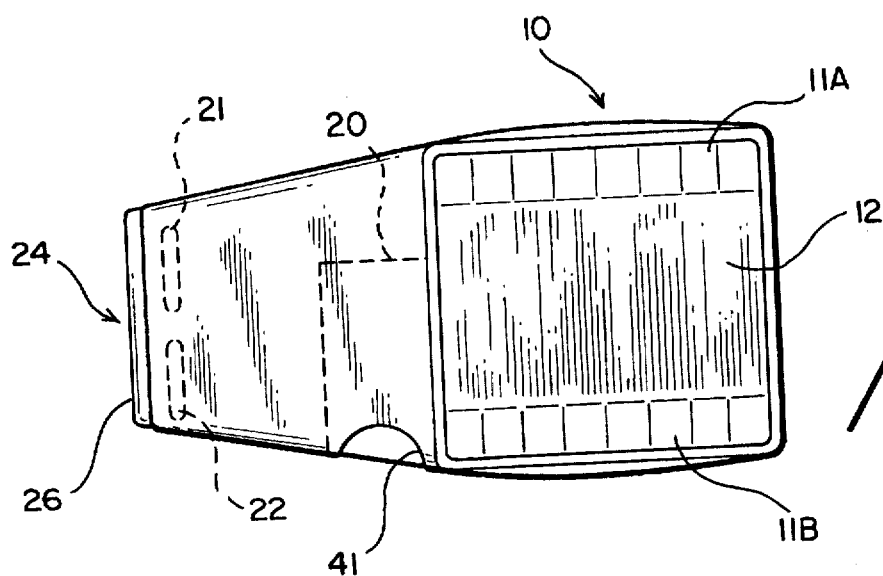
FIG. 2 is a somewhat diagrammatic top plan view of the integrated scanner and terminal device of FIG. 1, and illustrating further preferred features.
Figure 3:
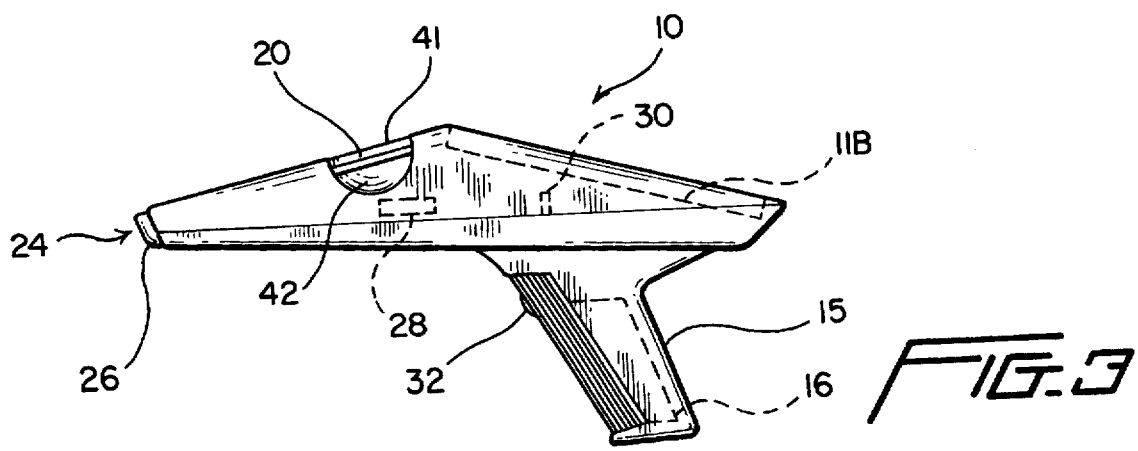
FIG. 3 is a somewhat diagrammatic side elevational view of the integrated scanner and terminal unit Of FIG. 1, but also illustrating the further preferred features of FIG. 2.

FIGS. 1, 2 and 3 illustrate an integrated automatic scan bar code reader and terminal device 10 of a generally pistol configuration having either deflected beam scanning, e.g., a cyclically deflected laser beam as in the incorporated patent application Ser. No. 905,779, now issued as U.S. Pat. No. 4,877,949, or a flash type full image scanner such as disclosed in the incorporated patent application Ser. No. 894,689, now issued as U.S. Pat. No. 4,877,949. The device 10 may have all of the features described in the Summary of the Invention, with a generally horizontal barrel portion of the pistol configuration including an integral keyboard, e.g., provided by keyboard segments 11A and 11B, and a display 12 directed generally rearwardly and upwardly when the grip 15 is held in its normal generally vertical orientation. The display 12 may display the results of each bar code scanning operation, battery parameters, and the like, just as was previously done on a separate hand-held terminal coupled by cable with a scanner. Handgrip 15 may contain a battery pack 16 for supplying all required power to the reader and terminal device 10. By way of example, a smart card receptacle is indicated at 20, FIGS. 2 and 3.

In the particular illustrated embodiment of FIGS. 1, 2 and 3, the scanner components are in the barrel portion of the pistol configuration and may include flashable light sources 21, 22 for directing light energy through a window at an end face 24 of the unit so as to substantially uniformly illuminate a bar code disposed in front of the unit. A hard rubber rim 26 may frame the window. Reflected light representing an image of a bar code may be focused by means of optics 28, FIG. 3, onto a charge coupled device photosensor array 30. A scan trigger 32 on the handgrip 15, FIG. 3, may serve to actuate a scan switch for producing an instantaneous flash illumination of the bar code by means of light sources 21, 22. Components 21, 22, 28 and 30 may correspond essentially with the comparable components of the incorporated patent application Ser. No. 894,689.

In FIGS. 2 and 3, smart card receptacle 20 is shown as having associated finger-receiving indentations 41, 42 for accommodating gripping of an edge of the smart card during insertion and removal of the card. An explanation concerning smart cards and the interfacing therewith is found in an article in *IEEE Spectrum*, February 1984, at pages 43–49. An earlier hand-held terminal with a smart card receptacle is shown in patent application Ser. No. 897,547, filed Aug. 15, 1986, Attorneys Docket 5769, which is assigned to the instant assignee, now abandoned.

As another example of scanner components which may be incorporated in unit 10, reference is made to the third, fourth, fifth and sixth figures of the incorporated patent application Ser. No. 905,779. An exemplary commercial laser scanner is represented by the Model LS8110 laser scanner available from Norand Corporation, Cedar Rapids, Iowa. This system utilizes as scan element a low mass single mirror, and has as a light source a 780 nanometer laser diode. The scan rate is thirty-six scans per second. Such a commercial laser scanner can be integrated with unit 10, essentially by attaching the laser scanner immediately in front of the smart card receptacle 20. The handle of the laser scanner would then be disposed in front of handgrip 15 and would provide the scan trigger instead of trigger 32. The laser scanner handle could contain the laser printed circuit board for both scanning and decoding while the handgrip 15 would contain the battery pack as indicated at 16.

For a more compact configuration, the smart card receptacle could be integrated into the present top wall of the LS8110 laser scanner. Further the handle and handgrip could be integrated into a single generally vertically disposed member so that the unit would be held in one hand and in the same way during scanning and during keyboard operation. In another version, the handle and handgrip could be connected at their lower ends, with a slot therebetween accommodating the fingers of one hand during manual grasping of handgrip 15 and during operation of trigger 32, located as in FIG. 3 on the handgrip 15.

A scanner terminal unit of the configurations here described may have a display 12 four inches wide by six inches in height so as to be adaptable to direct store delivery transactions, e.g., where the smart card in receptacle 20 may contain the information of an invoice listing all items and prices for goods being delivered to a retail store or the like. The display may be of the touch screen or liquid crystal type, and in either case may have key positions at 11A, 11B, e.g., of a membrane keyboard type. The unit may contain all the components required to accomplish scanning, decoding, display of decoded bar code data, direct store delivery transaction processing and display, computing, communications, power supply, and interfacing to other devices such as a personal computer as previously described in the Summary of the Invention. Exemplary components would include surface mount technology (SMT) CMOS memory, lithium backup batteries for memory retention, non-contact scanner, user replaceable EPROM, e.g., in the form of a smart card whose contents can be uploaded into the battery backed CMOS memory, and battery power for the scanner and terminal components, e.g., inexpensive user replaceable non-rechargeable cells, or a rechargeable nickel-cadmium battery pack. Two way optical communication with a separate base unit may be provided using a visible aiming light emitting diode which is disclosed in the incorporated patent application Ser. No. 894,689, and also is part of the LS8110 laser scanner. The hand-held unit may be microprocessor controlled and may operate from programming stored in random access memory that is lithium battery backed up. The entire unit may be environmentally sealed and water resistant, and free of connecting cables such as were common in the prior art.

Figure 4:
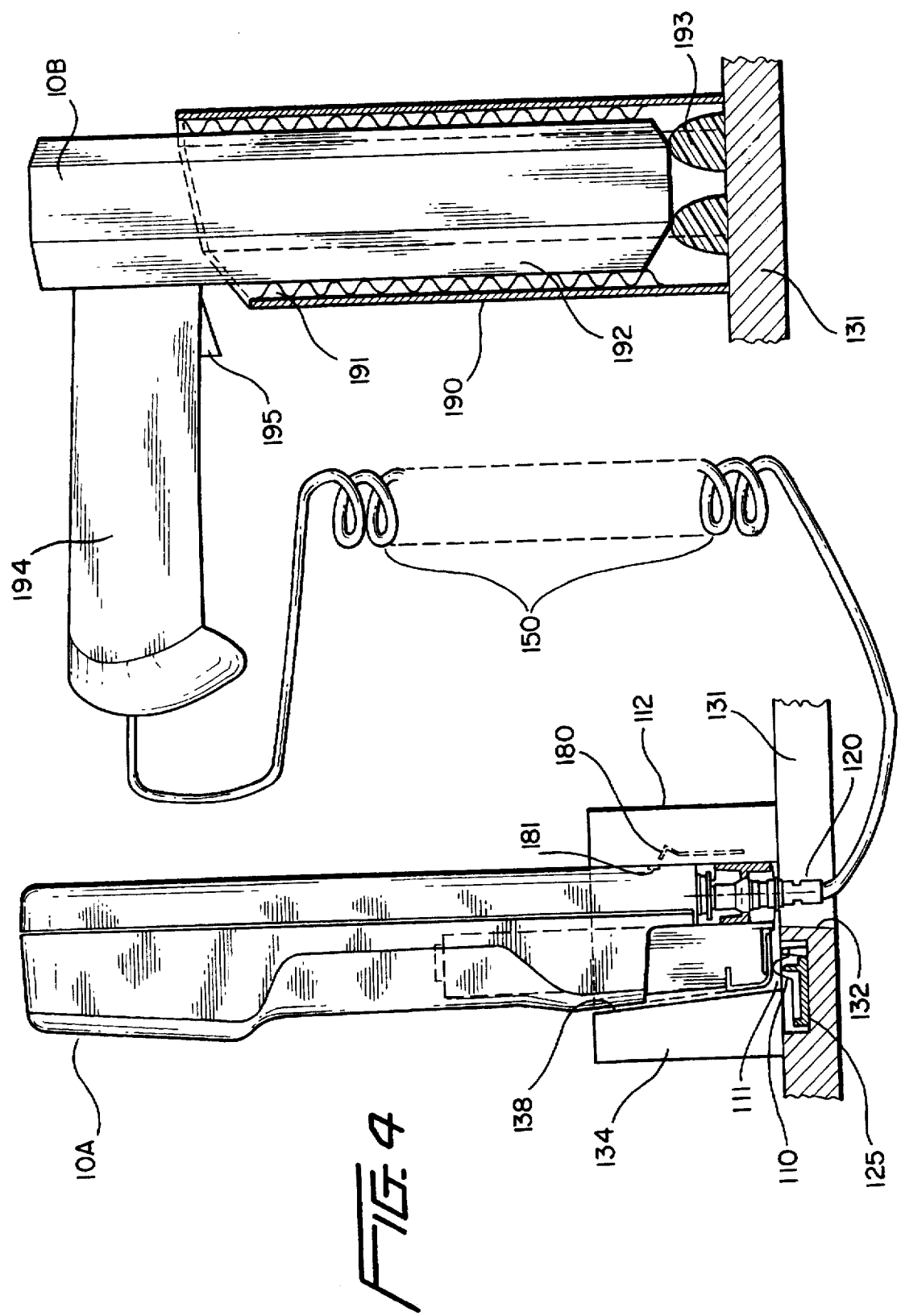
FIG. 4 is a somewhat diagrammatic partial vertical sectional view illustrating constructional details of a preferred adapter, a portable battery powered terminal being shown as being inserted part way into the adapter channel, to the point of initial electrical contact, and also indicating in diagrammatic fashion a laser bar code scanner device in a separate vehicle mounting or holster means and coupled with the terminal via an extendable coiled cable.
Figure 5:
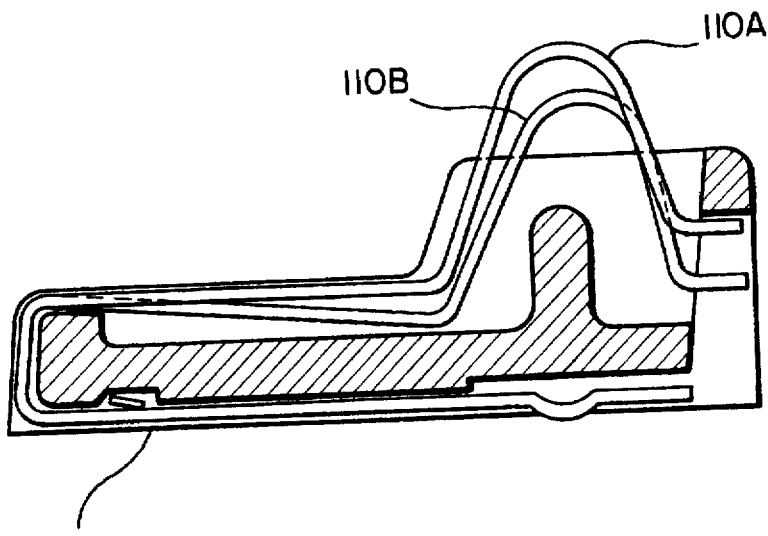
FIG. 5 is a somewhat diagrammatic longitudinal sectional view showing the adapter contact assembly of FIG. 4 on a greatly enlarged scale.
Figure 6:
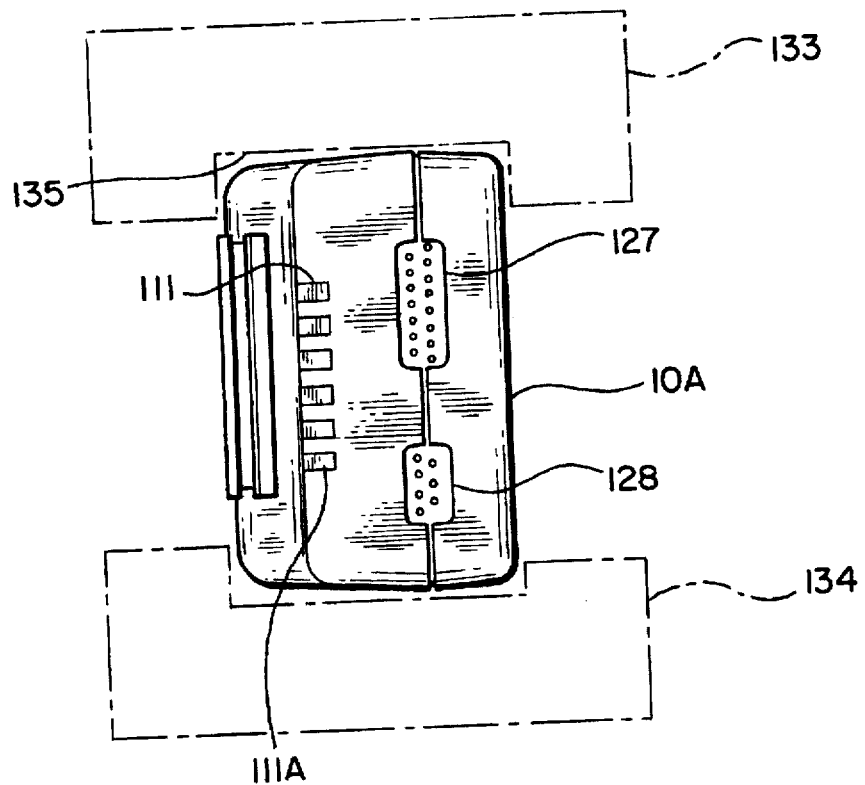
FIG. 6 is a diagrammatic bottom plan view of the terminal of FIG. 4, illustrating the external contact area of the terminal and also the connector fittings for coupling the terminal with a scanner such as the hand-held laser bar code scanner which is diagrammatically indicated in FIG. 4.

Battery charging contacts may be provided at the lower end of the handgrip 15, shown in FIGS. 1 and 2, that make contact with charging studs on the base unit for recharging of the batteries. While FIGS. 1 and 3 show the device 10 as a single, integrated bar code reader and terminal device, device 10 may be separated into an optical or RF scanner 10B and a terminal 10A as shown in FIG. 4. The RF scanner 10B is connected by a cable 150 and cable fitting 120 with a connector of the terminal 10A. The handle 15 of FIGS. 1 and 3 may contain a series of external contacts corresponding to contacts 111, as shown in FIGS. 4 and 6, for engaging with spring fingers corresponding to fingers 110, FIGS. 4 and 5. In a preferred embodiment, conductive contacts 111 are exposed, e.g., at an undersurface of each terminal device 10A. It is understood that similar contacts may be connected to the terminal 10, as shown in FIGS. 1–3. Referring to FIG. 4, the terminal device 10A is shown in initial contact with an adapter indicated at 112, with a connector 120 leading to a scanner 10B located in the open area of the adapter. The adapter may have a contact assembly 125 including spring fingers 110 aligned with respective terminal contacts 111. FIG. 5 is an enlarged view of contact assembly 125 and shows the initial position of contact finger 110 at 110A, and shows a deflected position at 110B (the terminal being fully inserted into and frictionally held by the adapter to maintain the deflected condition 110B of the spring fingers).

FIG. 6 is a bottom plan view of the terminal device 10A, showing its set of contacts such as 111, and showing connector fittings at 127 and 128 which may receive the scanner connector 120. In FIGS. 4 and 6, adapter 112 is shown as comprising a base part 131 which may be notched at 132 to accommodate scanner fitting 120, and a pair of upstanding generally C shaped parts 33 and 134 which define a channel 135 for receiving the terminal 10. The parts 133 and 134 may have sloping surfaces such as 136, FIG. 4, which limit the downward movement of a terminal into the receiving channel, and serve to frictionally retain the terminal with a suitable degree of pressure between contacts such as 111 and mating spring fingers such as 110.

The base unit may be a desk top type and include a charger for nickel cadmium batteries contained in the scanner terminal unit. The base unit may include a receptacle for user replaceable EPROMS so that new programming in the base unit can be uploaded into the hand-held unit when coupled with the base unit. Optical two way communication with the hand-held unit via the bar code reader window would free the interface of a mechanical connection for data communication.

It will be apparent that many modifications and variations may be effected without departing from the scope of the teachings of the present disclosure.

We claim as our invention:

1. In a data capture system, a hand-held automatic scan reader unit for scanning an optical segment and having a pistol configuration with a barrel having a longitudinal axis, and a handgrip adapted to be held in one hand of an operator, said handgrip having a free end and a handgrip axis directed generally transversely to said longitudinal axis of said barrel, said barrel having a first end arranged proximally to the operator and a second end arranged distally to the operator and oriented towards the optical segment when said reader unit is held by the operator in a normal scanning/data entry position, said barrel of the pistol configuration containing an optical scanner means comprising optical source means for directing illumination along a path extending past said second end and onto the optical segment essentially instantaneously and sensor means for reading reflected optical information therefrom, said barrel having an upper surface disposed above and a lower surface disposed below said longitudinal axis, said upper surface extending from said first end toward said second end, said handgrip including a trigger manually actuable to cause said optical source means to direct said illumination, an array of data entry keys at a data entry region of said upper surface, each of said keys requiring a manually applied thrust generally in the direction of said handgrip by the other hand of the operator, said handgrip being affixed to said barrel at said lower surface so as to be located beneath said data entry region of said upper surface when said reader unit is held in its normal scanning/data entry position; and said data entry region of said upper surface sloping away from said longitudinal axis with reference to a direction viewed from said first end toward said second end so that with said first end disposed proximally to the operator and with said reader unit in the normal scanning/data entry position, the operator can simultaneously view directly said data entry region, comfortably grasp said handgrip to balance and support said reader unit, manually actuate said trigger with the one hand and readily manually actuate selected of said data entry keys with the other hand.

2. In the data capture system according to claim 1, wherein there is included a first point disposed midway between said first and second ends, said data entry region of said upper surface extends at least substantially to a second point diebold over said first point.

3. In the data capture system according to claim 2, wherein said data entry region of said upper surface extends substantially the full extent of a width dimension of said barrel.

4. In the data capture system according to claim 1, wherein said data entry region of said upper surface comprises touch screen means.

5. In the data capture system according to claim 4, wherein said touch screen means comprises a data display means having an area of at least about twenty four square inches.

6. In the data capture system according to claim 5, wherein selected of said data entry keys are oriented in a line thereof, and said display means is disposed adjacent said line of data entry keys.

7. In the data capture system according to claim 4, wherein said touch screen means extends over a major portion of the area of a sloping portion of said upper surface which slopes away from said longitudinal axis of said barrel as viewed from said first end toward said second end of said barrel.

8. In a data capture system, a reader hand-held by an operator for automatically scanning information carried by an optical segment, said reader comprising:

a) a housing of a pistol configuration including a barrel with first and second surfaces and a handgrip extending from said first surface, said handgrip being configured to be held in one hand by the operator, including a handgrip axis and being affixed to said barrel, said barrel having a first end arranged proximally to the operator and a second end arranged distally to the operator when said reader is held by the operator in a normal scanning/data entry position with respect to the optical segment, said second surface disposed remote from said first surface and extending from said first end toward said second end;

b) optical scanner means contained within said barrel and comprising optical source means for directing illumination onto the optical segment, and sensor means for reading the illumination as modified by the information and reflected from the optical segment onto said sensor means; and c) an array of data entry keys defining the extent of a data entry region of said second surface and being manually actuated by the operator;

d) said handgrip axis intercepting said data entry region at an angle and a location so that the operator's line of sight to said data entry region is unobstructed when said handgrip is gripped by and said reader is oriented by the operator in the normal scanning/data entry position, so that the hand gripping said handgrip is in a supportive relationship to oppose the application of actuating pressure applied to said data entry region, and so that most of said data entry keys are disposed between said location and said first end of said barrel.

9. In the data capture system according to claim 8, said handgrip being substantially in an underlying relation to said data entry region so as to supply comfortable support and balance thereto during manual actuation thereof with said reader held in the normal scanning/data entry position.

10. In the data capture system according to claim 8, said data entry region comprising touch screen means.

11. In the data capture system according to claim 8, said reader having a display means which is conveniently read while said reader remains in said normal scanning/data entry position and substantially spaced in front of the operator.

12. In the data capture system according to claim 8, said reader having visible light beam means for assisting in aiming with respect to the optical segment.

13. In the data capture system according to claim 8, wherein said barrel includes a single optical window for permitting the transmission therethrough of said illumination directed from said optical scanner means and of said reflected illumination.

14. In the data capture system according to claim 13, wherein said single optical window is disposed proximal to said second end and said data entry region is disposed proximal to said first end, whereby the operator may enter data via said data entry region without displacement of said reader from the normal scanning/data entry position.

15. In the data capture system according to claim 8, wherein said data entry region has a proximal margin located relatively close to said first end of said barrel and a distal margin located relatively remote from said first end of said barrel, said angle and said location being selected so that said data entry region is disposed above said handgrip and so that a hand gripping said handgrip is in a supportive relationship to oppose the application of actuating pressure applied to said data entry region near said distal margin when reader is oriented by the operator in the normal scanning/data entry position.

16. In the data capture system according to claim 8, wherein said barrel includes a barrel axis and there is included a first point disposed midway between said first and second ends, said second surface generally slopes away from said barrel axis in a direction from said first end toward said second end, and at least substantially to a second point disposed over said first point.

17. In the data capture system according to claim 16, wherein said second surface extends substantially the full extent of a width dimension of said barrel.

18. In the data capture system according to claim 8, wherein said data entry region of second surface comprises touch screen means.

19. In the data capture system according to claim 18, wherein said touch screen means comprises a data display means having an area of at least about twenty-four square inches.

* * * * *